US012538869B2

(12) United States Patent
Field et al.

(10) Patent No.: US 12,538,869 B2
(45) Date of Patent: Feb. 3, 2026

(54) LAWNMOWER COLLECTION VESSEL FILL INDICATOR ASSEMBLIES

(71) Applicant: TECHTRONIC CORDLESS GP, Anderson, SC (US)

(72) Inventors: Alex Field, Atlanta, GA (US); Eli Tiemann, Atlanta, GA (US); Joshua Shafran, Atlanta, GA (US); Maxwell Koerner, Atlanta, GA (US); Phillip Holloway, Atlanta, GA (US); Samuel Kiley, Atlanta, GA (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 831 days.

(21) Appl. No.: 17/718,769

(22) Filed: Apr. 12, 2022

(65) Prior Publication Data

US 2022/0338417 A1 Oct. 27, 2022

Related U.S. Application Data

(60) Provisional application No. 63/180,290, filed on Apr. 27, 2021.

(51) Int. Cl.
*A01D 43/063* (2006.01)
*A01D 34/00* (2006.01)
*A01D 34/67* (2006.01)
*A01D 43/06* (2006.01)

(52) U.S. Cl.
CPC ....... *A01D 43/0631* (2013.01); *A01D 34/006* (2013.01); *A01D 34/67* (2013.01); *A01D 43/06* (2013.01)

(58) Field of Classification Search
CPC .............. A01D 34/006; A01D 34/67; A01D 43/06–43/0638; G01F 23/26–26/268
See application file for complete search history.

(56) References Cited

U.S. PATENT DOCUMENTS

| | | | |
|---|---|---|---|
| 4,589,249 A * | 5/1986 | Walker | A01D 34/662 56/16.6 |
| 5,321,939 A * | 6/1994 | Fuse | A01D 43/0631 56/DIG. 15 |
| 5,388,394 A | 2/1995 | Heismann | |

(Continued)

FOREIGN PATENT DOCUMENTS

| | | | |
|---|---|---|---|
| CN | 109716915 B | * 1/2021 | |
| DE | 202005009607 U1 | * 10/2005 | ......... A01D 43/0631 |

(Continued)

OTHER PUBLICATIONS

KR 20180132098 A (Year: 2018).*
European Search Report Corresponding with Application No. EP22169499 on Jan. 16, 2023 (3 pages).

*Primary Examiner* — Joseph M Rocca
*Assistant Examiner* — Madeline I Runco
(74) *Attorney, Agent, or Firm* — Dority & Manning, P.A.

(57) ABSTRACT

Collection vessel fill-indicator assemblies and mowers with collection vessel fill-indicator assemblies are provided. A collection vessel fill-indicator assembly includes a capacitance element configured to be disposed adjacent to a collection vessel of a mower to detect a fill state of the collection vessel; and an interference guard disposed around a portion of the capacitance element to shield the capacitance element from interference.

20 Claims, 4 Drawing Sheets

(56) References Cited

U.S. PATENT DOCUMENTS

| | | | |
|---|---|---|---|
| 5,913,804 A * | 6/1999 | Benway | A01D 34/71 |
| | | | 56/320.2 |
| 5,960,613 A * | 10/1999 | Mixon | A01D 43/0631 |
| | | | 56/16.6 |
| 6,038,843 A * | 3/2000 | Sebben | A01D 43/063 |
| | | | 56/320.2 |
| 7,412,905 B1 * | 8/2008 | Bishel | A01B 69/008 |
| | | | 180/401 |
| 2005/0066643 A1 | 3/2005 | Fukushima et al. | |
| 2015/0068182 A1 * | 3/2015 | Decoster | A01D 43/0631 |
| | | | 56/202 |
| 2017/0261361 A1 | 9/2017 | Rondano et al. | |
| 2018/0054966 A1 * | 3/2018 | Volovsek | A01D 43/063 |
| 2018/0242522 A1 * | 8/2018 | Duquesne | A01F 12/444 |
| 2019/0116729 A1 * | 4/2019 | Skoog | A01D 43/063 |
| 2019/0343046 A1 * | 11/2019 | West | G08B 21/182 |
| 2019/0343358 A1 * | 11/2019 | Davis | G05D 1/0088 |
| 2020/0029502 A1 * | 1/2020 | Hultgren | A01D 43/063 |
| 2020/0125104 A1 * | 4/2020 | Kuriyagawa | A01D 43/0631 |
| 2021/0255229 A1 * | 8/2021 | Basell | G01R 31/083 |
| 2023/0125762 A1 * | 4/2023 | Prediger | G01D 5/24 |
| | | | 324/658 |
| 2023/0136092 A1 * | 5/2023 | Honeyman | G01N 27/226 |
| | | | 324/664 |

FOREIGN PATENT DOCUMENTS

| | | | | |
|---|---|---|---|---|
| DE | 202011107423 U1 * | 1/2012 | | G01F 23/268 |
| DE | 202020101100 U1 * | 4/2020 | | |
| EP | 0292969 A1 | 11/1988 | | |
| EP | 0687407 A1 * | 12/1995 | | |
| EP | 2702856 A1 * | 3/2014 | | A01D 43/063 |
| EP | 2848110 A1 | 3/2015 | | |
| EP | 3278654 A1 * | 2/2018 | | A01D 43/0631 |
| GB | 2316596 A | 3/1998 | | |
| KR | 20180132098 A * | 12/2018 | | G01F 23/268 |
| WO | WO-2025012685 A1 * | 1/2025 | | |

* cited by examiner

LAWNMOWER COLLECTION VESSEL FILL INDICATOR ASSEMBLIES

CROSS-REFERENCE TO RELATED APPLICATIONS

The present application claims priority to U.S. Patent Application 63/180,290 filed on Apr. 27, 2021, the disclosure of which is incorporated by reference herein in its entirety.

FIELD

The present disclosure relates generally to lawnmower collection vessel fill indicators, and more particularly to lawnmower bag fill indicators.

BACKGROUND

Lawnmowers typically include mower decks defining cutting volumes housing one or more blades. As the one or more blades rotate, they cut underlying grass to form grass clippings. The grass clippings are ejected from the mower deck, typically by force generated by rotation of the blades. Some lawnmowers leave these grass clippings on the underlying surface. For example, mulching blades can cut the grass clippings into small particles which can be left on the surface to provide nutrients. Other lawnmowers collect these grass clippings in a collection vessel and allow the operator to empty the grass clippings at a desired time and location. By collecting grass clippings, the grass is left with a cleaner appearance. Additionally, the removal of the grass clippings prevents the build-up of clippings over time and allows the lawnmower to be used for collection operations, like leaf pick up.

Traditionally, operators have detected when the collection vessel is full by visually inspecting the collection vessel, by pushing against the outside of the collection vessel to feel for resistance, or another similar method. These methods typically require that the operator pause the mowing operation, thus wasting time and reducing mowing efficiency. Moreover, these methods lack accuracy and may not be performed at appropriate times.

If the operator does not notice that the collection vessel is nearing capacity, the grass clippings (which would have otherwise been captured and removed from the underlying surface) can begin to accumulate on the underlying surface. This may require the operator to perform a second pass over the surface after emptying the collection vessel, further wasting time.

Accordingly, improved lawnmower collection vessel fill indicator assemblies are desired in the art. In particular, lawnmower collection vessel fill indicator assemblies which provide better collection vessel fill detection would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a collection vessel fill-indicator assembly is provided. The collection vessel fill-indicator assembly includes a capacitance element configured to be disposed adjacent to a collection vessel of a mower to detect a fill state of the collection vessel; and an interference guard disposed around a portion of the capacitance element to shield the capacitance element from interference.

In accordance with another embodiment, a mower is provided. The mower includes a body having a cutting implement, wherein the body is coupled to a walking element such that the body is movable relative to an underlying surface; a collection vessel coupled to the body to receive discharge from the body; and a collection vessel fill-indicator assembly coupled to the body, wherein the collection vessel fill-indicator assembly detects a fill state of the collection vessel and indicates when the collection vessel reaches a threshold fill level.

In accordance with another embodiment, a method of emptying a collection vessel associated with a mower is provided. The method includes detecting a fill state of the collection vessel with a collection vessel fill-indicator assembly; decoupling the collection vessel from a body of the mower when an indicator of the collection vessel fill-indicator assembly indicates that the collection vessel is at a threshold fill level, wherein decoupling the collection vessel from the body does not move the collection vessel fill-indicator assembly with respect to the body of the mower; and emptying the collection vessel.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
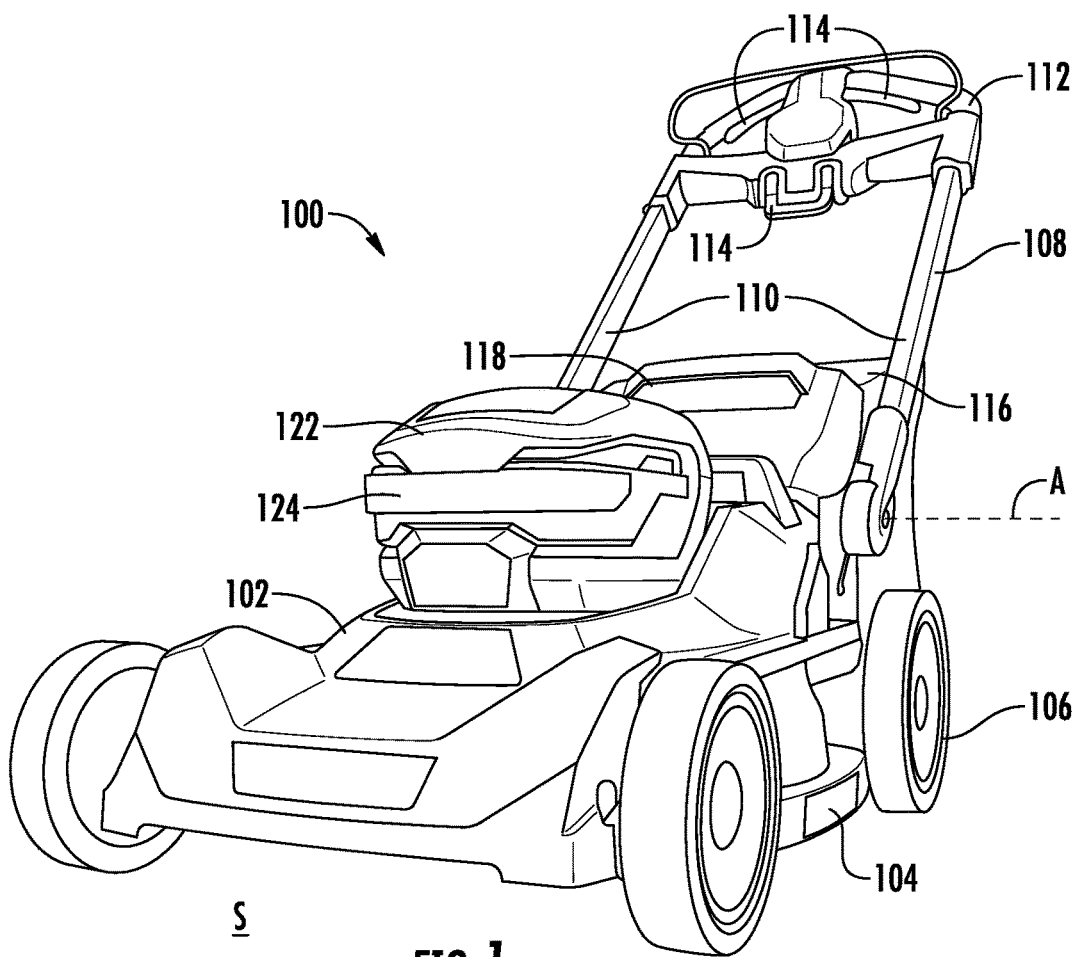
FIG. 1 is a perspective view of a lawnmower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, lawnmowers described herein can include collection vessels (e.g., bags) which receive debris (e.g., grass clippings) from the underlying surface. A collection vessel fill-indicator assembly of the lawnmowers can indicate to the operator when the collection vessel reaches a predetermined fill threshold. In an embodiment, the collection vessel fill-indicator assembly can operate by measuring capacitance of a volume within the collection vessel. As capacitance increases, the collection volume is filling. At a predetermined capacitance, an indicator of the collection vessel fill-indicator assembly can indicate to the operator that it is time to empty the collection vessel. In an embodiment, the collection vessel fill-indicator assembly can be coupled with a body of the lawnmower, and not be part of the collection vessel itself. More particularly, the capacitance element of the collection vessel fill-indicator assembly can be coupled within an internal volume of the lawnmower. In this regard, the collection vessel fill-indicator assembly, and more particularly the capacitance element, can remain free of debris generated during mowing, be minimally intrusive and cumbersome to the operator, exhibit increased durability, and provide an easier operational experience. These, and other, advantages will become clear to one of ordinary skill in the art after reading the entire disclosure.

Referring now to the drawings, FIG. 1 illustrates a perspective view of a lawnmower (hereinafter referred to as a mower) 100 including a body 102 housing a cutting implement (not depicted) disposed within a volume of a mower deck 104. The mower 100 further includes a walking element 106. The depicted walking element 106 includes four wheels, however, in other embodiments, the walking element 106 can include other walking means, such as treads, rollers, aerators, or the like for moving the body 102 relative to an underlying surface S. In some instances, at least a portion of the walking element 106 can be powered, i.e., the mower 100 can be self-propelled. In other instances, the mower 100 can be manually powered, e.g., pushed by the operator. While the mower 100 depicted in FIG. 1 is a walking mower where the operator stands behind and walks with the mower 100, in one or more non-illustrated embodiments, the mower 100 can be a riding mower, an autonomous mower, or another type of mower.

In the depicted embodiment, the mower 100 further includes a handle 108 extending from the body 102. The handle 108 can include, for example, two vertical members 110 connected together at an upper member 112. The mower 100 can include user interfaces 114 which allow the operator to control the mower 100. Exemplary user interfaces 114 include speed selectors, bails, ON/OFF interfaces, and the like. The handle 108 may be rotatable with respect to the body 102 about an axis A. In this regard, the handle 108 can be rotated forward to a stored configuration to reduce the areal footprint of the mower 100.

A collection vessel 116 can be arranged relative to the body 102 to receive debris, such as grass clippings, ejected from the mower deck 104. In the depicted embodiment, the collection vessel 116 is disposed to the rear of the mower deck 104 between the two vertical members 110 of the handle 108. In the depicted embodiment, the collection vessel 116 is a bag. The bag can include a rigid structure, e.g., an internal frame, to maintain at least some dimensional aspects of the bag even when the bag is empty, i.e., the bag walls are not supported by debris contained therein. In other embodiments, the collection vessel 116 can be a rigid structure, such as one or more plastic containers. The collection vessel 116 can be removable from the body 102 of the mower 100 to allow an operator to empty debris contained therein.

In an embodiment, the mower 100 can further include a cover 118 configured to selectively cover a discharge chute 120 (FIG. 4) of the mower deck 104 when the collection vessel 116 is not in use. As depicted, the cover 118 can move out of the way to open the chute 120 which connects the mower deck 104 with the collection vessel 116. In the open position, the cover 118 can be disposed at a vertical elevation above the collection vessel 116. In an embodiment, the cover 118 can rest at least partially on an upper surface of the collection vessel 116.

In one or more embodiments, the mower 100 can include a power unit 122 configured to power a cutting motor driving the cutting implement or a propulsion motor to drive the walking element 106. The power unit 122 can include a battery, an engine, or the like. In the depicted embodiment, the power unit 122 is a battery disposed above the mower deck 104, in front of the collection vessel 116. A light 124 can be disposed along a front side of the power unit 122 to illuminate a direction of travel.

Figure 2:
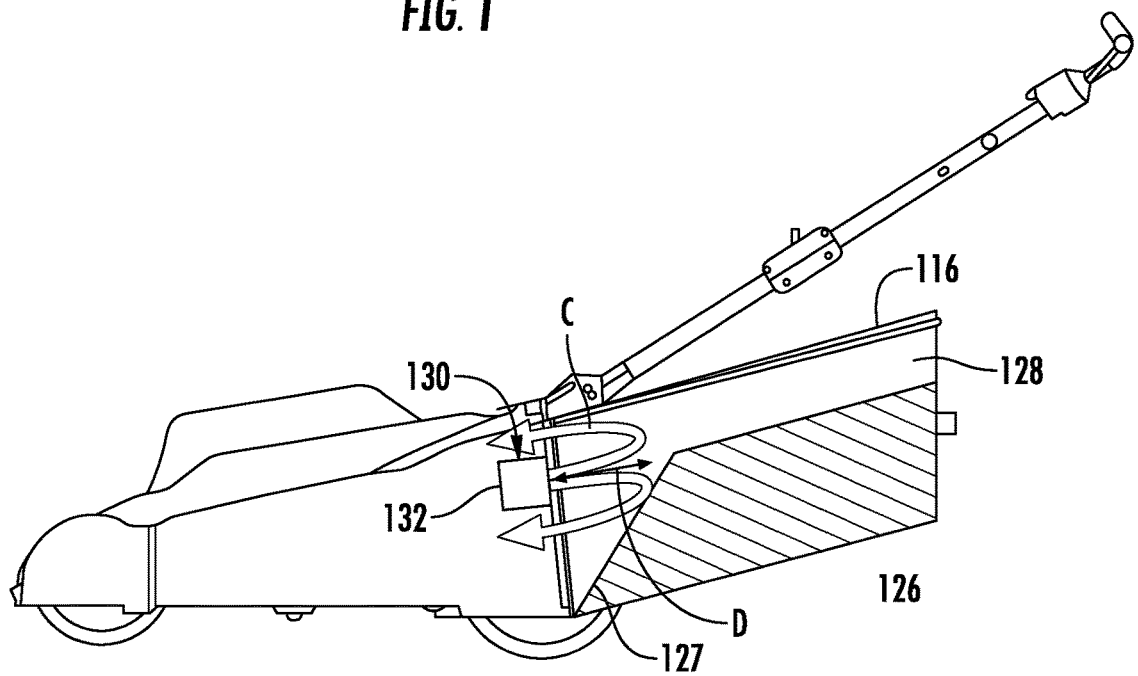
FIG. 2 is a schematic cross-sectional side view of the lawnmower in accordance with embodiments of the present disclosure.

FIG. 2 is a schematic cross-sectional view of the mower 100 depicting the collection vessel 116 containing clippings 126. The clippings 126 do not fill an entire volume of the collection vessel 116, as can be seen by the inclusion of empty space 128. When mowing, force generated by the cutting implement (alone or in combination with additional force generation sources, e.g., a bagger boost system) can propel the clippings 126 towards a rear end of the collection vessel 116. As the clippings 126 settle within the collection vessel 116, a sloped leading edge 127 of the clippings 126 may begin to form. When operating on inclined surfaces such as hills, or rough terrain, the leading edge 127 of the clippings 126 can take on different shapes, angles and forms other than the schematic representation depicted in FIG. 2.

In certain instances, the mower 100 can include a tilt detector (not depicted) configured to detect a tilt of the mower 100, e.g., a relative angular displacement of the mower 100 with respect to the direction of gravitational force. As the mower 100 tilts, the clippings 126 within the collection vessel 116 can move and the aforementioned leading edge 127 can move. The mower can utilize measurements from the tilt detector to, at least in part, inform an aspect of the leading edge 127 for purpose of determining how full the mower 100 is at the present time. In this regard, as the clippings 126 move within the collection vessel 116, the mower 100 can prevent undesirable collection vessel capacity readings.

During mowing operations, the clippings 126 are ejected from the mower deck 104 into the collection vessel 116. As the mowing operation continues, the amount of clippings 126 in the collection vessel 116 increases. Traditionally, the operator determined whether the collection vessel 116 was full by pushing against the collection vessel 116. The sidewalls of the collection vessel 116 become increasingly firm as the collection vessel 116 fills with clippings 126. By pushing on the sidewall of the collection vessel 116, it is possible for the operator to roughly estimate how much empty volume is left within the collection vessel 116. The greater the resistance to pushing, the less empty volume remained. However, this estimation is not always accurate and requires the operator to stop the mowing operation to check the capacity of the collection vessel 116.

As the volume of clippings 126 builds within the collection vessel 116, it becomes more difficult for additional clippings 126 to be discharged from the mower deck 104 into the collection vessel 116. That is, the clippings 126 within the collection vessel 116 can form a barrier against the addition of additional clippings 126 discharged from the mower deck 104. Typically, this happens before the collection vessel 116 is completely full, i.e., some volume of empty space 128 typically remains within the collection vessel 116 while collection rate of clippings 126 begins to drop, resulting in clippings 126 being deposited from the mower deck 104 to the underlying surface S. To prevent this undesirable discharge of clippings 126 onto the underlying surface S, the operator must empty the clippings 126 from the collection vessel 116. By way of non-limiting example, it may be desirable to empty the clippings 126 from the collection vessel 116 before the volume of clippings 126 exceeds 99% of the total volume of the collection vessel 116, such as before the volume of clippings 126 exceeds 95% of the total volume of the collection vessel 116, such as before the volume of clippings 126 exceeds 90% of the total volume of the collection vessel 116, such as before the volume of clippings 126 exceeds 85% of the total volume of the collection vessel 116, such as before the volume of clippings 126 exceeds 80% of the total volume of the collection vessel 116, such as before the volume of clippings 126 exceeds 75% of the total volume of the collection vessel 116, such as before the volume of clippings 126 exceeds 70% of the total volume of the collection vessel 116, such as before the volume of clippings 126 exceeds 65% of the total volume of the collection vessel 116.

In accordance with embodiments described herein, the operator can rely on a collection vessel fill-indicator assembly 130 (hereinafter referred to as the assembly 130) instead of pushing on the collection vessel 116 to determine when it is necessary to empty the collection vessel 116. As described hereinafter, the assembly 130 can generally rely on capacitance to detect a fill state of the collection vessel 116.

Figure 3:
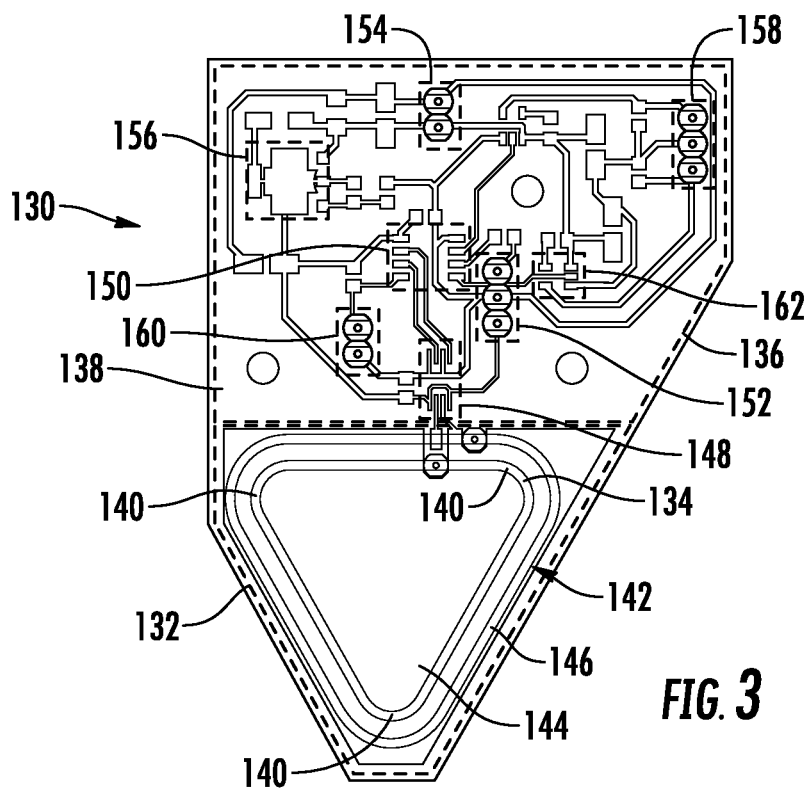
FIG. 3 is a front view of a collection vessel fill-indicator assembly in accordance with embodiments of the present disclosure.

Referring to FIG. 3, the assembly 130 can generally include a capacitance element 132 which measures capacitance between a sensor 134 of the capacitance element 132 and clippings 126 contained in the collection vessel 116. Referring again to FIG. 2, the sensor 134 and clippings 126 are generally spaced apart from one another by a distance D. As the distance D changes, i.e., as the volume of clippings 126 contained in the collection vessel 116 changes, the measured capacitance C measured by the sensor 134 changes. That is, for instance, as the volume of clippings 126 increases, i.e., the clippings 126 move closer to the sensor 134, measured capacitance C increases. Conversely, as the volume of clippings 126 decreases, e.g., the clippings 126 are emptied, measured capacitance C decreases. The amount of measured capacitance can be correlated with the volume of clippings 126 disposed within the collection vessel 116.

Referring again to FIG. 3, the assembly 130 can further include a circuit board, such as a printed circuit board (PCB) 136. In some instances, the PCB 136 and sensor 134 can be part of a single structure. That is, for example, the PCB 136 and sensor 134 can be coupled together through a common substrate 138. The PCB 136 and sensor 134 can be in electronic communication with one another. In this regard, measured capacitance from the sensor 134 can be communicated to the PCB 136. The PCB 136 can then generate a signal to create an indication to the operator when the collection vessel 116 reaches a threshold fill level.

As depicted, in accordance with an embodiment, the sensor 134 can have a generally triangular shape. By way of other non-limiting examples, the sensor 134 can have another polygonal shape, such as, e.g., a square shape, a pentagonal shape, another type of polygonal shape, an arcuate shape, or the like. Corners 140 of the sensor 134 can be rounded. Rounded corners 140 can improve linear response to capacitance measurements as compared to shapes having sharp corners. A rounded triangle design, such as that depicted in FIG. 3, can maximize the areal size of the capacitance element 132 given the selected sensing region.

An interference guard 142 can be disposed around at least a portion of the capacitance element 132, e.g., around at least a portion of the sensor 134, to shield the capacitance element 132 from interference which might affect capacitance measurements. In an embodiment, the interference guard 142 can include a guard plate 144 and an outer loop 146 coupled to the guard plate 144 and extending around a perimeter of at least a portion of the capacitance element 132. As depicted, the guard plate 144 can be disposed behind the capacitance element 132. As installed on the mower 100, the capacitance element 132 (and more particularly, the sensor 134) can be disposed between the guard plate 144 and the volume associated with the collection vessel 116. In this regard, the guard plate 144 can prevent interference which might be generated by another portion of the mower 100, e.g., interference generated by the power source 122 or by one or more motors of the mower 100. The outer loop 146 can extend around the capacitance element 132 to shield the capacitance element 132 from similar interference emanating from a lateral side of the assembly 130.

The interference guard 142 can increase detection distance of the capacitance element 132 in a direction associated with the collection vessel 116 and provide unidirectional sensing. Thus, the interference guard 142 can increase capacitance sensitivity and accuracy resulting in more reliable operation.

Reference hereinafter made to particular elements and arrangements of said elements on the PCB 136 are made for exemplary purposes only. Other elements and arrangements are possible without deviating from the scope of the disclosure. In an embodiment, the PCB 136 can include a capacitance sensor integrated circuit (IC) 148 which detects when capacitance measured by the capacitance element 132 exceeds a predefined threshold. The PCB 136 can include a microcontroller 150 having data processing elements which can control sensitivity of the capacitance sensor IC 148. A programming header 152 can allow for selective programming of the microcontroller 150. For instance, the programming header 152 can include electrical contacts, e.g., pins, which allow for electrical attachment to a programming assembly. Using the programming header 152, the assembly 130 can be programmed and adjusted. In an embodiment, the same assembly 130 can be used with a plurality of different mower types. The programming header 152 can allow the operator or an installation technician to set the proper threshold capacitance values for each mower and collection vessel type. That is, different collection vessels may warrant different capacitance thresholds. The PCB 136 can further include a power contact 154 which receives power from an external source, e.g., the power source 122. A regulator 156, e.g., a linear regulator, can step down voltage received at the power contact 154 for components of the PCB 136. A first contact 158 can be electrically coupled to an indicator described hereinafter for indicating to the operator one or more statuses of the collection vessel 116. A second contact 160 can be electrically coupled to a switch described hereinafter for indicating the presence of the collection vessel 116 at the mower 100. A driver 162 can provide constant current along at least the first contact 158.

Figure 4:
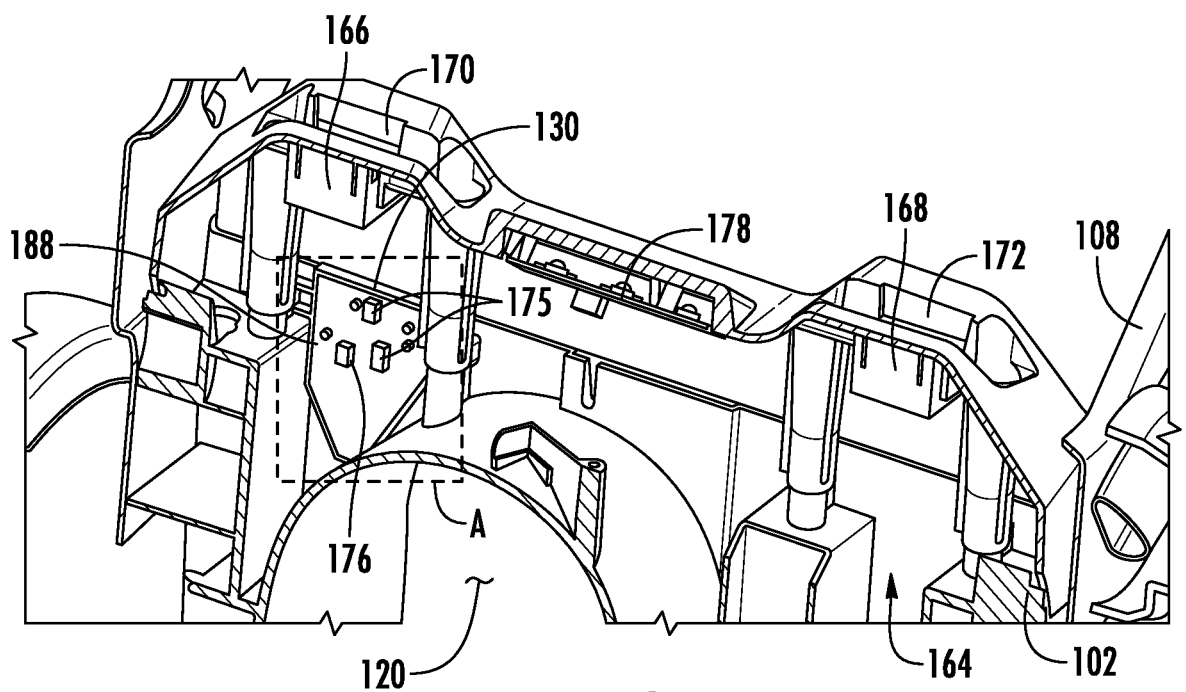
FIG. 4 is a perspective view of an internal volume of the lawnmower as seen from a front left side of the lawnmower with a portion of a body of the lawnmower removed in accordance with embodiments of the present disclosure.

FIG. 4 depicts a view of an internal volume 164 of the body 102 as seen looking rearwardly toward the handle 108 from a front, left side of the mower 100 with a portion of the body 102 removed. In the depicted embodiment, the assembly 130 is disposed within the internal volume 164 of the body 102 and oriented such that the sensor 134 faces rearwardly toward the collection vessel (not depicted in FIG. 4) located behind the chute 120.

Switches 166 and 168 are located along retention grooves 170 and 172, respectively. The switches 166 and 168 can detect the presence of a wire 174 (FIG. 5) which couples the collection vessel 116 with the body 102. When the wire 174 is present within the retention grooves 170 and 172, the switches 166 and 168 can communicate the presence to the PCB 136 through the second contact 160 of the PCB 136. When the wire 174 is absent from the retention grooves 170 and 172, the switches 166 and 168 can communicate the absence to the PCB 136 through the second contact 160. While not depicted, the switches 166 and 168 can be in electronic communication with the PCB 136 through one or more wires (not illustrated) which extend between the switches 166 and 168 and one or more ports 175 of the assembly 130.

In an embodiment, the switches 166 and 168 can both be the same type of switches. In another embodiment, the switches 166 and 168 can be different from each other. By way of non-limiting example, at least one of the switches 166 and 168 can be a reed switch, a hall effect sensor, a push button sensor, a slide sensor, a toggle, a rotary switch, a pressure sensor, or the like.

In an embodiment, the assembly 130 can be in electronic communication with an indicator 178 through, e.g., one or more ports 176. The indicator 178, described in greater detail below, can provide indication to the operator of the fill state of the collection vessel 116. More particularly, the indicator 178 can indicate to the operator when the collection vessel 116 is at a threshold fill level. The threshold fill level can correspond with a threshold volume of clippings 126 disposed within the collection vessel 116. In some instances, this threshold volume can be preset, e.g., at the factory. In other instances, this threshold volume can be selectable by the operator, e.g., at the user interface 114. In some embodiments, the threshold volume can be fixed. In other embodiments, the threshold volume can be adjustable.

Figure 5:
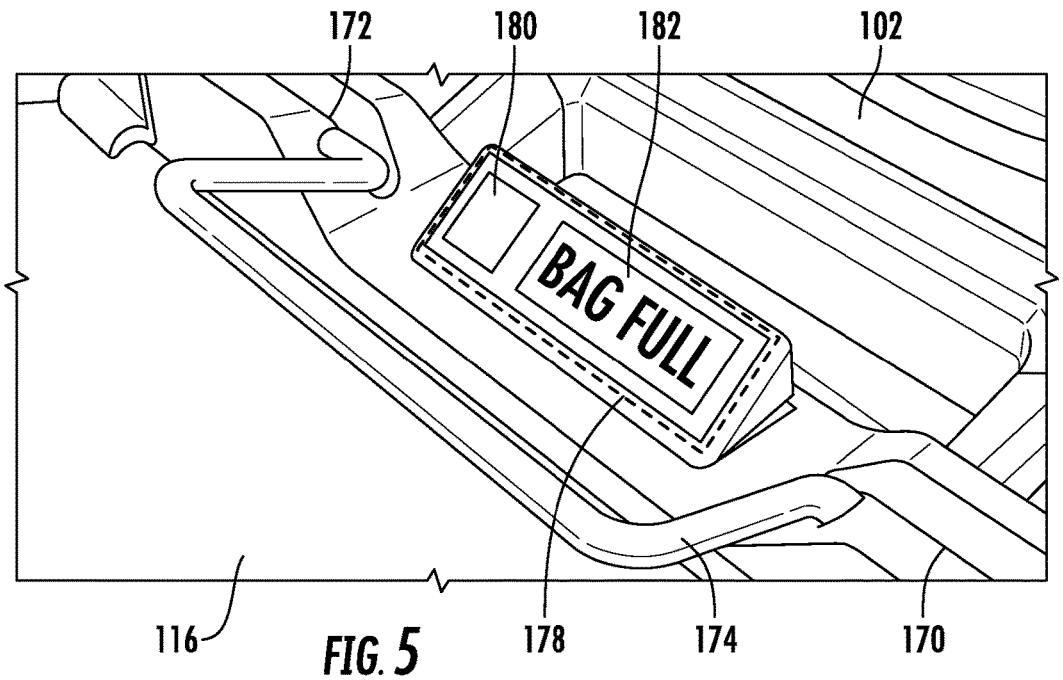
FIG. 5 is a perspective view of a portion of the lawnmower as seen from a rear, right side of the lawnmower in accordance with embodiments of the present disclosure.

FIG. 5 depicts a perspective view of a portion of the mower 100 as seen at an interface between the collection vessel 116 and the body 102 as seen from a rear, right side of the mower 100. As depicted, the collection vessel 116 can be coupled to the body 102 through the wire 174. In an embodiment, the wire 174 can be part of the collection vessel 116 and selectively retained on the body 102 through the retention grooves 170 and 172. The operator can release the wire 174 from the retention grooves 170 and 172, e.g., by rotating and displacing the wire 174 in the forward direction. Thus, the wire 174 and retention grooves 170 and 172 can form a quick release interface. Other exemplary coupling mechanisms between the collection vessel 116 and body 102 include snaps, ties, threaded or non-threaded fasteners, and the like. The collection vessel 116 can form a debris-tight interface with the body 102 whereby a significant majority of debris exiting the chute 120 makes its way to the collection vessel 116 without unwanted discharge to the external environment.

As described above, the indicator 178 indicates the fill state of the collection vessel 116 to the operator. The depicted indicator 178 is a visual indicator. Other indicators 178 can include audible indicators, tactile indicators, or the like. The depicted indicator 178 includes two indicators, including a first indicator 180 and a second indicator 182. The first indicator 180 can indicate whether the assembly 130 is actively monitoring the fill state of the collection vessel 116, i.e., whether the assembly 130 is in the on state and actively monitoring the fill state or in the off state. By way of non-limiting example, the first indicator 180 may indicate active monitoring of the fill state when a light, e.g., an LED, is illuminated. Conversely, when the first indicator 180 is off, e.g., the LED is not illuminated, the assembly 130 may not be actively monitoring the fill state of the collection vessel 116. The second indicator 182 can indicate the fill state of the collection vessel 116. More particularly, the second indicator 182 can indicate when the fill state has reached the threshold fill level. In this regard, the second indicator 182 is shown with indicia which states "BAG FULL". When illuminated, the operator can discern that it is time to empty the full collection vessel 116. In some instances, the second indicator 182 can include a colored interface, e.g., an amber filter, which, when illuminated, suggests to the operator the presence of an alert message irrespective of the illuminated indicia.

In some instances, the second indicator 182 can be a binary indicator. That is, for example, the second indicator 182 may operate between an OFF state, where the operator is to assume the collection vessel 116 does not require emptying, and an ON state, where the operator is being notified that the collection vessel 116 requires emptying. In other instances, the second indicator 182 can provide additional information such as a relative remaining capacity of the collection vessel 116, a used volume of the collection vessel 116, or the like.

Figure 6:
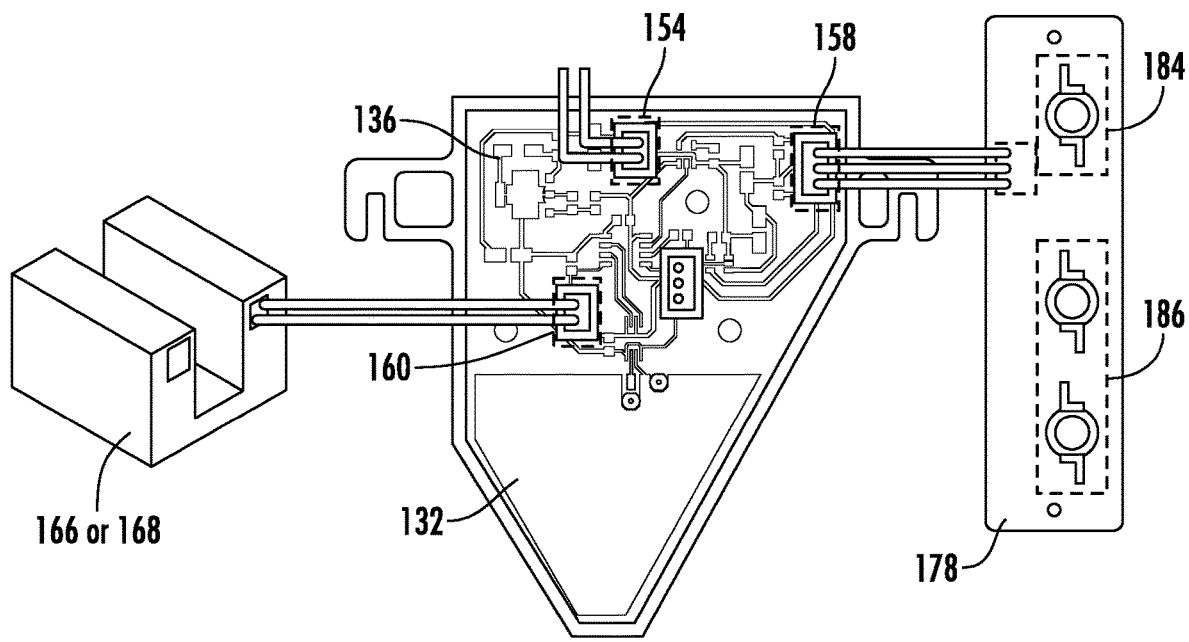
FIG. 6 is a schematic view of the collection vessel fill-indicator assembly in accordance with embodiments of the present disclosure.

FIG. 6 illustrates a schematic view of the assembly 130 including the capacitance element 132 and PCB 136, the indicator 178, and one of the switches 166 or 168. As depicted, the indicator 178 can be electrically coupled to the PCB 136 through the first contact 158. The switch 166 or 168 can be electrically coupled to the PCB 136 through the second contact 160. The power contact 154 of the PCB 136 can be coupled to the power source 122.

As described with respect to FIG. 5, the indicator 178 can include a first indicator 180 and a second indicator 182. As shown in FIG. 6, the indicator 178 can include a first light generating source, such as one or more first LEDs 184, and a second light generating source, such as one or more second LEDs 186. The first and second LEDs 184 and 186 can be driven through logic controlled, e.g., at the PCB 136. By way of example, the first LEDs 184 can be illuminated when the switch 166 or 168 (and in a more particular embodiment, when both switches 166 and 168) detect the presence of the wire 174 in the retention grooves 170 and 172. The second LEDs 186 can be illuminated when the capacitance element 132 measures a capacitance C at or above a threshold level indicating that the collection vessel 116 is at a threshold fill state requiring emptying.

Figure 7:
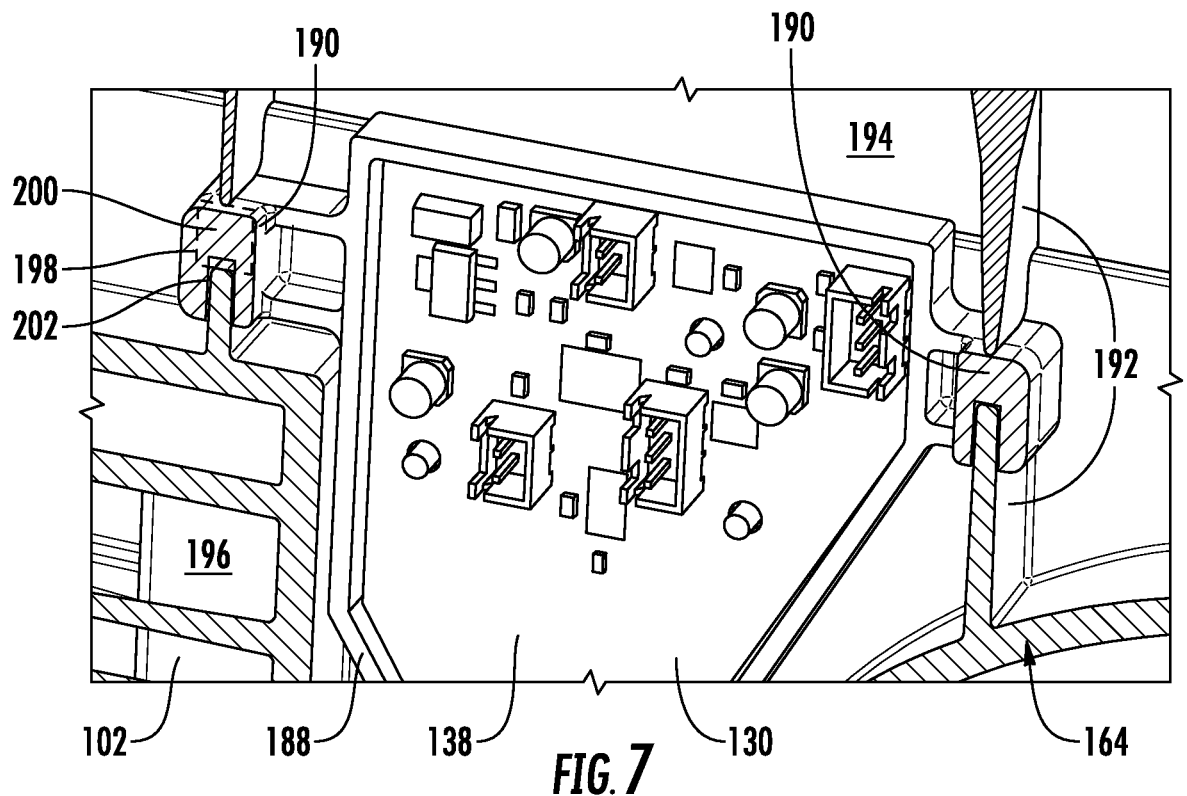
FIG. 7 is a view of the internal volume of the lawnmower as seen in Box A in FIG. 4 with a portion of a housing of the collection vessel fill-indicator assembly removed in accordance with embodiments of the present disclosure.

FIG. 7 illustrates the mower 100 as seen in Box A in FIG. 4. As depicted in FIG. 4, the capacitance element 132 and PCB 136 are disposed within a housing 188. In FIG. 7, a surface of the housing 188 is removed, exposing a back side of the substrate 138 on which the capacitance element 132 and PCB 136 can be mounted.

Referring to FIG. 7, the housing 188 can include structure 190 to couple the assembly 130 to the body 102 of the mower 100. In certain instances, the structure 190 can be integral with the housing 188, such as, e.g., depicted in FIG. 7. In other instances, the structure 190 can be detachable from the housing 188.

In an embodiment, the body 102 can define ribs 192. The ribs 192 can extend from the body 102 into the internal volume 164. In some instances, the body 102 can include a plurality of pieces joined together. For example, as depicted in FIG. 7, the body 102 includes a first piece 194 and a second piece 196 each defining a complementary rib 192. When the first and second pieces 194 and 196 of the body 102 are coupled together, a gap 198 can form between the ribs 192 of the first and second pieces 194 and 196. The structure 190 can fit within the gap 198 and be held in place at least in part by the ribs 192.

In a particular embodiment, and by way of non-limiting example, the structure 190 can include a body 200 defining a slot 202 which receives one of the ribs 192. To install the assembly 130, the housing 188 can be inserted into the internal volume 164 such that the slots 202 align with the rib 192 of the second piece 194. The housing 188 can be biased such that the rib 192 presses into the slots 202. This biasing can be performed prior to installation of the first piece 194 or by the first piece 194 itself, e.g., by the ribs 192 of the first piece 194. In certain instances, the assembly 130 can be further secured to the body 102 by one or more fasteners, e.g., one or more threaded or non-threaded fasteners (not depicted).

In certain instances, at least a portion of the assembly 130, such as the substrate 138, the PCB 136, or the capacitive element 132 can be potted in place with, e.g., an elastomeric compound (not depicted). The elastomeric compound can have a thickness of at least 0.01 inches, such as at least 0.02 inches, such as at least 0.03 inches, such as at least 0.04 inches, such as at least 0.05 inches, such as at least 0.075 inches, such as at least 0.1 inches. The elastomeric material can protect components of the assembly 130 from moisture and debris. In an embodiment, the assembly 130 can achieve IP55 rating.

Figure 8:
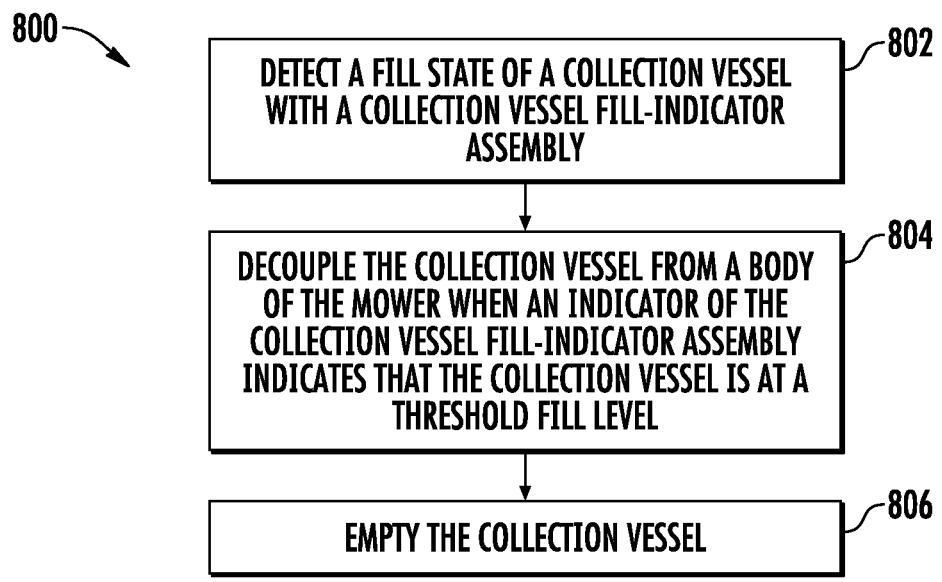
FIG. 8 is a flowchart of a method of operating a lawnmower in accordance with embodiments of the present disclosure.

FIG. 8 depicts an exemplary method 800 of using the collection vessel associated with the mower. More particularly, the method 800 can describe emptying the collection vessel. The method 800 can include a step 802 of detecting a fill state of the collection vessel with a collection vessel fill-indicator assembly. The collection vessel fill-indicator assembly can include any one or more of the features as described with respect to the assembly 130. For example, the collection vessel fill-indicator assembly can include a capacitance element, a PCB, an indicator, and switches. In an embodiment, the step 802 of detecting the fill state can include continuous monitoring of the fill state of the collection vessel. More particularly, the step 802 of detecting the fill state can include continuous monitoring of the fill state when the collection vessel is detected as being present at the mower 100. In another embodiment, the step 802 of detecting the fill state can include non-continuous monitoring of the fill state of the collection vessel. For instance, the collection vessel fill-indicator assembly can check the fill state at preset duration intervals (e.g., 1 second intervals).

Detecting the fill state of the collection vessel at step 802 can include measuring capacitance of a volume associated with the collection vessel. As capacitance changes, the fill state is assumed to have changed. For instance, as capacitance increases, the fill state of the collection vessel is assumed to increase. This increase in fill state corresponds with less empty space within the collection vessel. Once the fill states reaches a threshold fill level, the collection vessel is ready to be emptied.

The method 800 can further include a step 804 of decoupling the collection vessel from a body of the mower when an indicator of the collection vessel fill-indicator assembly indicates that the collection vessel is at the threshold fill level. Decoupling the collection vessel from the body of the mower may be performed, e.g., by undoing the wire 174 from the retention grooves 170 and 172. Decoupling the collection vessel does not result in moving the collection vessel fill-indicator assembly with respect to the body of the mower. That is, because the collection vessel fill-indicator assembly is coupled to the body itself, removing the collection vessel does not result in removal of the collection vessel fill-indicator assembly. This increases operational longevity of the collection vessel fill-indicator assembly and prevents accidental damage which might result as a result of removing the collection vessel fill-indicator assembly.

The method 800 can further include a step 806 of emptying the collection vessel. Once emptied, the collection vessel can be reattached to the body of the mower and the mowing operation can resume. When the wire 174 is received within retention grooves 170 and 172, the first indicator 180 can illuminate to let the operator know that the assembly 130 is on and monitoring the fill state of the collection vessel.

In certain instances, the collection vessel fill-indicator assembly may be in the on state only when the operator is actively engaging one or more actuating elements of the mower. For example, use of the collection vessel fill-indicator assembly may require that the operator be actively depressing a bail of the mower. In this regard, the collection vessel fill-indicator assembly can automatically turn on when the collection vessel is connected to the body of the mower and the bail is depressed. In such a manner, the power source of the mower can be prevented from draining its charge when the mower is not in active use.

Further aspects of the invention are provided by one or more of the following embodiments:

Embodiment 1. A collection vessel fill-indicator assembly comprising: a capacitance element configured to be disposed adjacent to a collection vessel of a mower to detect a fill state of the collection vessel; and an interference guard disposed around a portion of the capacitance element to shield the capacitance element from interference.

Embodiment 2. The collection vessel fill-indicator assembly of any one or more of the embodiments, wherein the interference guard comprises: a guard plate, wherein the capacitance element is disposed between the guard plate and a volume associated with the collection vessel; and an outer loop coupled to the guard plate and extending around a perimeter of the capacitance element.

Embodiment 3. The collection vessel fill-indicator assembly of any one or more of the embodiments, wherein the capacitance element comprises rounded corners.

Embodiment 4. The collection vessel fill-indicator assembly of any one or more of the embodiments, wherein the collection vessel fill-indicator assembly further comprises a printed circuit board (PCB) in electronic communication with the capacitance element, and wherein the PCB and capacitance element are part of a single structure.

Embodiment 5. The collection vessel fill-indicator assembly of any one or more of the embodiments, wherein the capacitance element is in electrical communication with a visual indicator that visually indicates when the capacitance element detects a capacitance level indicative of the collection vessel being at a threshold fill level.

Embodiment 6. A mower comprising: a body having a cutting implement, wherein the body is coupled to a walking element such that the body is movable relative to an underlying surface; a collection vessel coupled to the body to receive discharge from the body; and a collection vessel fill-indicator assembly coupled to the body, wherein the collection vessel fill-indicator assembly detects a fill state of the collection vessel and indicates when the collection vessel reaches a threshold fill level.

Embodiment 7. The mower of any one or more of the embodiments, wherein the body defines an internal volume, wherein the collection vessel fill-indicator assembly is disposed at least partially within the internal volume, and wherein the collection vessel comprises a bag removably coupled to the body.

Embodiment 8. The mower of any one or more of the embodiments, wherein the mower comprises an indicator assembly which indicates to an operator when the bag is present at the mower and when the collection vessel reaches the threshold fill level.

Embodiment 9. The mower of any one or more of the embodiments, wherein the mower further comprises a handle extending from the body, wherein the indicator assembly is disposed on the body at a base of the handle.

Embodiment 10. The mower of any one or more of the embodiments, wherein the collection vessel fill-indicator assembly is configured to determine when the collection vessel reaches the threshold fill level at least in part using tilt detection information associated with a relative tilt angle of the mower.

Embodiment 11. The mower of any one or more of the embodiments, wherein the mower further comprises a bail, and wherein the collection vessel fill-indicator assembly is active only when the bail is actively engaged.

Embodiment 12. The mower of any one or more of the embodiments, wherein the collection vessel fill-indicator assembly comprises: a housing; and a capacitance element coupled to the housing, wherein the housing comprises an engagement element having an interference fit with a rib of the body of the mower.

Embodiment 13. The mower of any one or more of the embodiments, wherein the collection vessel fill-indicator assembly remains coupled to the body when the collection vessel is removed from the body.

Embodiment 14. The mower of any one or more of the embodiments, wherein the collection vessel fill-indicator assembly comprises: a capacitance element configured to be disposed adjacent to the collection vessel to detect a fill state of the collection vessel; and an interference guard disposed around a portion of the capacitance element to shield the capacitance element from interference.

Embodiment 15. The mower of any one or more of the embodiments, wherein the interference guard comprises: a guard plate, wherein the capacitance element is disposed between the guard plate and a detection volume associated with the collection vessel; and an outer loop coupled to the guard plate and extending around a perimeter of the capacitance element.

Embodiment 16. The mower of any one or more of the embodiments, wherein the capacitance element comprises rounded corners.

Embodiment 17. The mower of any one or more of the embodiments, wherein the collection vessel fill-indicator assembly further comprises a printed circuit board (PCB) in electronic communication with the capacitance element, and wherein the PCB and capacitance element are part of a single structure.

Embodiment 18. A method of emptying a collection vessel associated with a mower, the method comprising: detecting a fill state of the collection vessel with a collection vessel fill-indicator assembly; decoupling the collection vessel from a body of the mower when an indicator of the collection vessel fill-indicator assembly indicates that the collection vessel is at a threshold fill level, wherein decoupling the collection vessel from the body does not move the collection vessel fill-indicator assembly with respect to the body of the mower; and emptying the collection vessel.

Embodiment 19. The method of any one or more of the embodiments, wherein the collection vessel fill-indicator assembly comprises: a capacitance element configured to be disposed adjacent to the collection vessel to detect a fill state of the collection vessel; and an interference guard disposed around a portion of the capacitance element to shield the capacitance element from interference.

Embodiment 20. The method of any one or more of the embodiments, wherein the interference guard comprises: a guard plate, wherein the capacitance element is disposed between the guard plate and a detection volume associated with the collection vessel; and an outer loop coupled to the guard plate and extending around a perimeter of the capacitance element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A collection vessel fill-indicator assembly comprising:
   a capacitance sensor configured to be disposed adjacent to a collection vessel of a mower to detect a fill state of the collection vessel; and
   an interference guard to shield the capacitance sensor from interference, the interference guard comprising:
      a guard plate, wherein the capacitance sensor is disposed between the guard plate and a volume associated with the collection vessel; and
      an outer loop coupled to the guard plate and extending around a perimeter of the capacitance sensor,
      wherein the collection vessel fill-indicator assembly is active only when a bail of the mower is actively engaged.

2. The collection vessel fill-indicator assembly of claim 1, wherein the capacitance sensor is configured to be disposed within an internal volume of the mower.

3. The collection vessel fill-indicator assembly of claim 1, wherein the capacitance sensor comprises rounded corners.

4. The collection vessel fill-indicator assembly of claim 1, wherein the collection vessel fill-indicator assembly further comprises a printed circuit board (PCB) in electronic communication with the capacitance sensor, and wherein the PCB and capacitance sensor are part of a single structure.

5. The collection vessel fill-indicator assembly of claim 1, wherein the capacitance sensor is in electrical communication with a visual indicator that visually indicates when the capacitance sensor detects a capacitance level indicative of the collection vessel being at a threshold fill level.

6. The collection vessel fill-indicator assembly of claim 1, wherein the collection vessel fill-indicator assembly is configured to determine when the collection vessel reaches a threshold fill level at least in part using tilt detection information associated with a relative tilt angle of a mower to which the collection vessel is attached.

7. A mower comprising:
   a body having a cutting implement, wherein the body is coupled to a walking element such that the body is movable relative to an underlying surface;
   a collection vessel coupled to the body to receive discharge from the body; and
   a collection vessel fill-indicator assembly coupled to the body, wherein the collection vessel fill-indicator assembly detects a fill state of the collection vessel and indicates when the collection vessel reaches a threshold fill level at least in part using tilt detection information associated with a relative tilt angle of the mower.

8. The mower of claim 7, wherein the body defines an internal volume, wherein the collection vessel fill-indicator assembly is disposed at least partially within the internal volume, and wherein the collection vessel comprises a bag removably coupled to the body.

9. The mower of claim 8, wherein the mower comprises an indicator assembly which indicates to an operator when the bag is present at the mower and when the collection vessel reaches the threshold fill level.

10. The mower of claim 9, wherein the mower further comprises a handle extending from the body, wherein the indicator assembly is disposed on the body at a base of the handle.

11. The mower of claim 7, wherein the mower further comprises a bail, and wherein the collection vessel fill-indicator assembly is active only when the bail is actively engaged.

12. The mower of claim 7, wherein the collection vessel fill-indicator assembly comprises:
   a housing; and
   a capacitance element coupled to the housing,
   wherein the housing comprises an engagement element having an interference fit with a rib of the body of the mower.

13. The mower of claim 7, wherein the collection vessel fill-indicator assembly remains coupled to the body when the collection vessel is removed from the body.

14. The mower of claim 7, wherein the collection vessel fill-indicator assembly comprises:
   a capacitance element configured to be disposed adjacent to the collection vessel to detect a fill state of the collection vessel; and
   an interference guard disposed around a portion of the capacitance element to shield the capacitance element from interference.

15. The mower of claim 14, wherein the interference guard comprises:
   a guard plate, wherein the capacitance element is disposed between the guard plate and a detection volume associated with the collection vessel; and
   an outer loop coupled to the guard plate and extending around a perimeter of the capacitance element.

16. The mower of claim 14, wherein the capacitance element comprises rounded corners.

17. The mower of claim 14, wherein the collection vessel fill-indicator assembly further comprises a printed circuit board (PCB) in electronic communication with the capacitance element, and wherein the PCB and capacitance element are part of a single structure.

18. A method of emptying a collection vessel associated with a mower, the method comprising:
   detecting, using an indicator associated with a collection vessel fill-indicator assembly of the mower, a fill state of the collection vessel reaching a threshold fill level;
   releasing a bail of the mower to cause the collection vessel fill-indicator assembly to turn off;
   decoupling the collection vessel from a body of the mower; and
   emptying the collection vessel.

19. The method of claim 18, wherein the collection vessel fill-indicator assembly comprises:
   a capacitance sensor configured to be disposed adjacent to the collection vessel to detect a fill state of the collection vessel; and an interference guard disposed around a portion of the capacitance sensor to shield the capacitance sensor from interference.

20. The method of claim 19, wherein the interference guard comprises:
   a guard plate, wherein the capacitance sensor is disposed between the guard plate and a detection volume associated with the collection vessel; and
   an outer loop coupled to the guard plate and extending around a perimeter of the capacitance sensor.

* * * * *